Patented June 6, 1944

2,350,960

UNITED STATES PATENT OFFICE 2,350,960

PRODUCTION AND ACID TREATMENT OF HYDROUS CHROMIC OXIDE

Marc Darrin, Baltimore, Md., assignor to Mutual Chemical Company of America, New York, N. Y., a corporation of New Jersey No Drawing. Original application June 7, 1938, Serial No. 212,392. Divided and this application May 9, 1940, Serial No. 334,283

4 Claims. (Cl. 23—145)

This invention relates to improvements in the manufacture of chromic oxide pigments, etc., including a new fluffy chromic oxide having the empirical formula $Cr_2O_3$; and methods of manufacturing such pigments.

The invention also includes new intermediate products of such manufacture, including a uniform hydrated or hydrous chromic oxide, and a new acid combination of the hydrous oxide both in the form of a syrup and in the form of a soft, friable "coke."

The invention also includes new pigment compositions containing the new fluffy chromic oxide. The invention also includes new composite pigments containing the new fluffy chromic oxide in combination with other oxides such as alumina, cobalt oxide, etc., in the form of chrome-alumina, chrome-cobalt, chrome-alumina-cobalt, etc. pigments.

The invention also includes new and improved methods for the manufacture of such intermediate products, as well as for the manufacture of the new composite pigments.

The new fluffy chromic oxide has a distinctive and characteristic structure. It disintegrates without grinding to a fine, uniform, porous, soft, fluffy green powder, the particles of which have a very fine skeleton or sponge-like structure. It is a valuable paint pigment, having a low apparent specific gravity and desirable oil absorption properties, imparting body and viscosity to the oil, without undesirable display of shortness; and a paste made with oil can be diluted without packing of the pigment which settles as a voluminous soft layer.

The new fluffy chromic oxide has valuable properties which adapt it for use as a permanent pigment, as for example in heat resistant paints for hot water and steam pipes, locomotive boilers, furnaces; in sun-proof and weather-resistant paints for agricultural machines, fences, roofs, blinds, and the like; in oil, water, lime and mortar colors, printing inks, colored paper, wallpaper printing, bank notes, plastics, ceramics, roofing granules, glass, porcelain enamels, and various chemical reactions both direct and catalytic.

The new fluffy chromic oxide has valuable and distinctive oil absorption properties. For example, it combines in a superior manner with paint oils, forms stronger and clearer colors, has a greater range of shades, and possesses greater flexibility of combination with other materials, than the ordinary dense forms of chromic oxide. It has other advantages in its properties and uses which will be evident to those skilled in the respective arts in which such pigments are used. It possesses permanence and resistance to light, heat and weathering which is well known for the ordinary dense anhydrous chromic oxide pigments. It can be readily manufactured in an economical manner from available materials, as will more fully appear from the following description.

The ordinary method of producing chromic oxide is by firing a mixture of a bichromate, such as $Na_2Cr_2O_7$, with a reducing agent such as sulfur, whereby most of the bichromate is reduced to an insoluble green oxide held in a sintered mass of sodium sulfate, $(Na_2SO_4)$, which is removed by leaching with water, leaving as a residue the ordinary dense chromic oxide, having the empirical formula $Cr_2O_3$. For pigment purposes the coarse and hard crystalline particles are reduced to a fine powder by grinding, but the product is still very dense and somewhat abrasive in character. Its crystal structure has been investigated by Davey (Phys. Review 21, 716 (1923)), by obtaining X-ray diffraction patterns, who concludes that the molecule is hexahedral, consisting of three atoms of oxygen at the corners of an equilateral triangle with two chromium atoms immediately above and below the centre of the triangle, three such molecules forming a unit prism. Other investigators indicate similar conclusions. The structural formula may be written as follows:

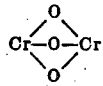

The true specific gravity (A. S. T. M. D153–27) of known grades of pure chromic oxide, $Cr_2O_3$ (as reported in Gardner "Physical and Chemical Examination of Paints, Varnishes, Lacquers, Colors" 7th ed., Oct. 1935, Pigment Index Supplement p. A1201–1344) is between 5.04 and 5.20. The apparent specific gravity (grams per cubic centimeter of the sifted and lightly packed dry powder) of known grades of pure anhydrous chromic oxide examined was found to be between 1,337 and 1,915, whereas the new fluffy oxide may test 0.740. Most variations of the new fluffy chromic oxide fall between 0.300 and 0.900, and all fall between 0.200 and 1.200. No known grades of pure chromic oxide of which I am aware fall within these limits.

The color of known grades of pure chromic oxide is olive green, varying with firing temperature over a narrow range in respect to mass color and tinting strength (A. S. T. M. D387–36). By way of comparison the new fluffy oxide responds to mass color and tinting strength tests in a superior manner; the color is a purer and brighter shade of green both in mass and tint, the hue, can be varied over a greater range between blue-greens and yellow-greens, and it has a stronger tinting strength.

The oil absorption (A. S. T. M. D281-31) of known grades of pure chromic oxide, 99% $Cr_2O_3$, is between 9.4 to 18.0 (Gardner—Paint Index Supplement A1201-1344 (Oct. 1935)). The higher figure of 18.0 is unusual and may be due to unreported presence of alumina. The more common figure for oil absorption is 15.0. By way of comparison the new fluffy oxide may test 25.0. Most variations of the fluffy chromic oxide fall between 20.0 and 30.0, and all between 18.5 and 50.0. No known grades of pure chromic oxide of which I am aware fall within these limits.

In general the oil absorption characteristics of known grades of pure chromic oxide are very poor. Practically no body or viscosity is imparted to the oil, and there is a very decidedly undesirable display of shortness, such as is well known to those familiar with testing and use of paint pigments. When thinned the pigment tends to settle and packs into a dense mass occupying a volume proportionate to its apparent specific gravity. Likewise it responds unfavorably to running tests, brushing tests and other practical application tests which are dependent on proper affinity between the pigment and oil. In fact, known grades of pure chromic oxide, as far as I am aware, do not have many of the desired properties of a paint pigment, except green color and permanence, and would not be employed if other suitable, permanent green pigments were available. It is common to avoid its use, except when conditions are such that chromic oxide must be used because of its unique permanence.

The new fluffy chromic oxide eliminates or greatly reduces the above undesired properties, through greater oil absorption, better affinity towards the oil, very superior body and viscosity, freedom from shortness, and superior response towards settling tests, running tests, brushing tests and related practical application tests. The new fluffy oxide can be made in stronger and brighter shades, and over a greater range of color. It is better blending, and adapted to increased fields of applications. Like other good pigments it may be thinned without great loss of body, retaining its shade and hiding power. This is accomplished without loss of permanency toward light, heat, weathering, lime, etc.

The apparent specific gravity of the new pigment may be less than half that of the ordinary oxide, being in one of its preferred forms between 0.300 and 0.900. By methods which will appear from the following its range can be extended. Its oil absorption is above 18. A very satisfactory range can be made between 20 and 30. On high dilution of an oil paste, the new soft fluffy chromic oxide settles as a voluminous soft layer which does not pack. The volume is proportionate to its apparent specific gravity. In physical form it is a very soft, porous uniformly fine powder, requiring no grinding. The particles have a very fine sponge-like, or spider-like, skeleton structure.

Although the new soft fluffy chromic oxide is very permanent towards light and ordinary high temperature, it is not stable at unusual, high temperatures. On being brought to equilibrium by continued heating at 2300° F. It changes to a dense form similar to the ordinary oxide. Impurities such as alkalies greatly hasten the change, whereas, oxides of some metals and non-metals, as for example $Al_2O_3$, retard the change. At 2800° F. the change may be very rapid. The new oxide appears to be an intermediate form which had heretofore not been recognized.

My investigations indicate that the preparation of the new fluffy chromic oxide depends on rapid firing to the necessary temperature and avoidance of prolonged heating at such temperature, and also is benefited by the elimination or removal of impurities from the hydrous oxide before firing which, unless removed, would hasten the speed or change to the ordinary dense form of oxide. Substances which retard the speed of the final change or hasten the speed of formation of the desired intermediate product without hastening the final change, are beneficial. In carrying out the firing, it is advantageous that the material pass quickly through the lower oxidation temperatures and then be held for a limited and regulated time at the temperature at which the desired change and formation of the intermediate oxide occurs. This varies somewhat with the presence or absence of other materials, and the method of firing. In general and by way of example, I have found that good results have been obtained in making the new fluffy chromic oxide by rapid firing at about 2300-2500° F., and with limitation of the heating to avoid converting the intermediate oxide to a dense form.

The method of manufacturing the new fluffy chromic oxide includes a series of steps or processes, certain of which result in the production of new intermediate products. The complete method of manufacture may be considered as divided into four unit operations but it is not necessary that the operations be so divided in actual manufacturing practice, since they may be combined so as to reduce or increase the number of stages without departing from the invention. The four successive unit operations are as follows: (1) Reduction of a solution of a chromate with an aqueous alkali sulfide emulsion of sulfur under regulated conditions to produce hydrous chromic oxide; (2) Treatment of the hydrous oxide to remove soda compounds; (3) Conversion of the hydrous oxide into a new sulfate combination in the form of a syrup or soft friable "coke"; and (4) Firing under regulated conditions to give the new fluffy chromic oxide.

1. First Stage—Sulfur Reduction

As the first stage in the production of the new fluffy chromic oxide, a hydrous chromic oxide is prepared in a form such that it can be washed to eliminate sodium compounds. While the production of such a hydrous chromic oxide is not limited to the particular method I have described, I find that a hydrous oxide particularly adapted for use can be prepared by my new method of reduction, and that the hydrous oxide so prepared appears to be of a substantially single type, instead of a mixture of variously hydrated hydrous oxides, due to the maintenance of substantially uniform conditions during the production of the hydrous oxide.

In producing the hydrous oxide I reduce a solution of a chromate in the wet way by means of sulfur, using an alkaline sulfur emulsion; but I have found that better and more uniform results may be obtained under controlled alkalinity conditions, employing, for example, an alkali sulfide, such as sodium sulfide ($Na_2S$) or better yet, a polysulfide such as $Na_2S_5$; and by adding the chromate solution gradually to the hot alkaline sulfur emulsion containing the sulfide, while maintaining controlled alkalinity conditions. It is desirable to avoid using too concentrated solutions in order to produce the desired uniformly coordinated hydrous oxide. The chromate solution is run slowly into the heated water emulsion of sulfur and alkali sulfide with rapid stirring. The reaction produces sodium thiosulfate and hydrous chromic oxide, proceeding essentially to theoretical completion in a manner which appears to be illustrated by the following type of reaction:

$$6Na_2CrO_4 + 11S + 34H_2O \rightarrow 3Cr_2O_3 + 5Na_2S_2O_3.5H_2O + Na_2S.9H_2O$$

The following example will illustrate my new constant-alkalinity method of making hydrous chromic oxide by maintaining substantially constant concentrations of all soluble reacting and reaction products:

Dissolve 240 pounds of sodium sulfide ($Na_2S.9H_2O$)

and 1240 pounds of sodium thiosulfate ($Na_2S_2O_3.5H_2O$)

in 80 gallons of water near the boiling point. Emulsify into this solution 176 pounds of powdered sulfur and heat until the boiling point is at some definite temperature between 100° and 110° C., adding water if the boiling point should raise above the desired operation temperature, which by way of example may be 105° C. Lowering the boiling point by dilution, somewhat improves the quality of the final product, but it increases the size of equipment and the amount of water to be evaporated for recovery of thiosulfate. Now run slowly into the reaction kettle 486 pounds of sodium chromate ($Na_2CrO_4$) dissolved in about 120 gallons of water. The rate of addition is such as to keep the boiling point constant. Nor should it be more rapid than the rate at which the chromate is completely reduced. More water may be added either to the chromate solution or the reaction kettle in order to assist in the control of these conditions. For instance, if the boiling point goes above 105° C., it is an indication that more water is required. The complete reduction of chromate at any stage may be determined in any customary manner, for instance, by transferring a drop to a piece of filter paper. A characteristic bright yellow color at the outer edges of the stain indicates unreduced chromate. The above reduction may require from 15 minutes to 2 hours.

Now emulsify into the reaction mixture an additional charge of 176 pounds of powdered sulfur, followed by slow addition of another lot of 486 pounds of chromate dissolved in 120 gallons of water, controlling rate and conditions as in the first case. Repeat with successive charges of sulfur and chromate in exactly the same manner until the reaction kettle is filled to operating capacity, which may be, by way of example, a total of four charges. At the end of the last addition the kettle contains essentially a suspension of crude hydrous chromic oxide in a solution of sodium thiosulfate together with some sodium sulfide. Run off about three-quarters of this mixture, and continue to charge the reaction kettle with successive amounts of sulfur and chromate solution, repeating all operations in the same manner as previously, and for an indefinite number of times. The green sludge in the liquor drawn off from the kettle is separated from the thiosulfate solution as by decantation or filtration. It contains all the chromium in the form of a hydrous chromic oxide associated with some soda salts.

The aqueous solution first prepared may be made, as described, of thiosulfate and sulfide, for example, in the molecular ratio of five to one; and the amount of water such that the boiling point of the solution corresponds to the reaction temperature, e. g., 100 to 105° C. The sulfur emulsified into this mixture with heat may go into solution as a polysulfide, such as $Na_2S_5$. All the sulfur does not have to be added at the start, but only sufficient, and with further addition from time to time, to keep the ratio somewhat above that to form $Na_2S_5$. As it is consumed by the chromate, more sulfur may be added.

The chromate solution is added slowly with stirring and boiling, the rate being such that the boiling point remains constant. In this process the ratio of thiosulfate to sulfide to water is practically the same near the end of the operation as at the start.

The method illustrated in the above example is adapted to continuous, or semi-continuous, modifications, and variations may be made therein, as will be apparent to those skilled in the art. It is not necessary to add thiosulfate at the start, as it is quickly formed, and the desired equilibrium will be approximated by regulating the boiling point; but, if thiosulfate is not added at the start, and if it is desired to establish the exact equilibrium, the originally added sodium sulfide may be neutralized, since fresh sulfide is generated in the desired ratio simultaneously with the thiosulfate formation. If the original sulfide is neutralized in such a way as to simultaneously oxidize it to thiosulfate, only five-sixths should be neutralized to produce the proper equilibrium ratio.

If a crude sodium chromate liquid is employed, it should first be freed from such impurities as lime and iron. Alumina and silica do not appear harmful. Reaction kettles should be used such as do not impart harmful impurities to the reaction mixture.

To explain further the reaction and the nature of the process, it may be noted that the hydrous oxide ($Cr_2O_3.XH_2O$) is precipitated and is not in solution, and increasing amounts do not affect the equilibrium of the dissolved products. Likewise, the chromate is consumed as added, and does not change the equilibrium since the reaction products remaining in solution are in approximately the same proportions as those initially present.

While I do not wish to limit myself to any theoretical explanation, it is my theory that under such conditions of equilibrium the hydration of the hydrous oxide formed, or the character of coordination of the hydrous oxide, will be uniform, and will tend to produce a single type of hydrous chromic oxide complex, instead of a mixture of variously hydrated hydrous oxides.

Among the features of novelty and of advantage of this new method of reduction of sodium chromate and of producing hydrous chromic oxide, may be mentioned the control of alkalinity, and dilution, adaptability to continuous operation, increased yield of by-products, and production of a uniform type of hydrous chromic oxide. The exact type of hydrous chromic oxide apparently depends on conditions such as temperature, dilution, alkalinity, proportions of reagents, rate of reaction, etc.

While it is not essential to the subsequent steps of the process that the particular hydrous oxide produced by the new regulated process of reduction be used, and while other types of hydrous chromic oxide can be used in the subsequent steps, the use of the new uniform type of hydrous oxide produced by the above process is advantageous.

2. SECOND STAGE—ACID TREATMENT

In preparing the new fluffy chromic oxide, it is important to remove admixed and adhering alkali salts with substantial completeness; and it is important that the hydrous chromic oxide be of such a character as to permit treatment and removal of such alkali compounds. The hydrous chromic oxide complex produced in accordance with the above process is well adapted for this purpose.

The raw green hydrous oxide sludge from the sulfur reduction is first washed with water to remove the bulk of the thiosulfate and other soluble salts. This can be done to good advantage at 60 to 90° C. It is then treated with acid for a length of time sufficient to cause the hydrous chromic oxide to lose its ability to hold the alkali, to render possible the removal of alkali impurities. Digestion with dilute sulfuric acid has been found satisfactory, using a temperature between 60–80° C., until the pH is down to about 3 and then washing to remove acid and freed alkali impurities. No harm results if the pH is a little lower or higher, providing it remains fairly constant indicating that acid is no longer being consumed. The pH of the acid liquor during its digestive contact with the hydrous chromic oxide, that is, during the digestion period, should be maintained between approximately 3 and 5. When the pH of the acid liquor is above about 5 it does not act upon the hydrous chromic oxide to cause it to lose its ability to hold alkali impurities. If the pH is permitted to go appreciably below 3, dissolution of the hydrous chromic oxide in the liquor will take place. The above treatment removes alkali, as an alkali sulfate or bisulfate, down to at least 0.2%, on the basis of the $Cr_2O_3$. The more complete the soda removal the better the final product. Part of the hydrous chromic oxide may be converted to an insoluble basic sulfate. At times a very small amount may go into solution, but seldom sufficient to color the effluent. Attrition at this stage as for example in a ball mill tends to improve the product, but is not essential. Alumina and many acid radicals, as for instance $SO_4$ and $PO_4$, are beneficial.

The hydrous oxide, which has been prepared and purified as described in the foregoig, may be employed as a wet sludge or cake, or it may be dried under controlled conditions to produce hydrous oxides of various degrees of hydration.

The hydrous oxides prepared as above described are soluble in acids, for example, hydrochloric, sulfuric, phosphoric, acetic, oxalic, tartaric, etc. This affords a method for improved manufacture of many chromium compounds more economically, and in greater purity and variety of types, than has heretofore been practical by the usual methods. For example, it is possible to produce in this manner with ease many very water soluble and unusual crystalline blue and violet chromic sulfate hydrates, as well as the ordinary green amorphous varieties. The blue and violet modifications are insoluble in ethyl alcohol. As commercially new chromium products they offer new fields of application in various chemical industries, including textile and tanning industries, etc.

3. THIRD STAGE—CONVERSION TO SYRUP

The third stage of the process consists in combining the hydrous chromic oxide with an acid, for example, with 60° Bé. sulfuric acid. While the proportions may be somewhat varied, I have found the proportions most generally effective are just above equivalent proportions to form the normal chromic sulfate. In the following example, an excess of about one-sixth is employed. Water enters into the reaction to effect the desired coordination of the sulfate, which I am led to believe contains one-third of the $SO_4$ within the coordinated chromium complex. I have formulated, by way of illustration, the type of reaction which I am led to believe takes place:

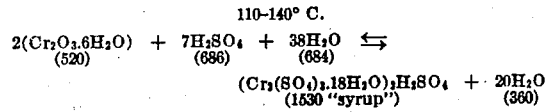

In carrying out the process, by way of example, the hydrous oxide, sulfuric acid, and water react in approximately the proportions illustrated by the above equation. At first the mixture of hydrous oxide, sulfuric acid and water is a cloudy, green emulsion. The temperature of conversion may be from 110° C. to 140° C., depending on the time of heating, proportions, character of hydrous oxide, manner of stirring, etc. The chief reaction may occur at about 120° C. At about 115° C. the color may become deeper green, and by 120° C. much greener and clearer. This may be followed by some foaming and thickening, becoming greener and clearer. Between 130 and 140° C., it may start to skim over the top, with some "coking" at the bottom. At this stage the conversion may be substantially complete. All or part of the $20H_2O$ indicated in the above equation may be driven off during the conversion. If the conversion is carried too far, it may be brought back by adding a little water with stirring.

As a result of this process there appears to be formed a new coordinated sulfate combination of the hydrous oxide. I am led to believe that the coordination formula of the green syrup is of the following type of single internal coordination, with varying amounts of free, or loosely held, sulfuric acid and water:

Apparently the proper coordination of the sulfate combination is directly related to the structure of the final fluffy chromic oxide obtainable therefrom by regulated firing.

4. FOURTH STAGE—FIRING

The firing to produce the fluffy chromic oxide pigment can be carried out in successive stages, by first heating the syrup to convert it into a "coke," and by further heating of the coke under regulated conditions to produce the desired pigment. The firing can, however, be advantageously carried out by adding the syrup directly to the furnace. Both of these methods will be described by way of example.

(A) *Conversion of syrup to coke before firing*

On heating the syrup to 200–250° C. it produces a soft, friable "coke" having a green-gray color. This product is reactive toward water, going quickly into solution, with a voluminous white colloidal separation, probably of a basic chromic sulfate. On further heating, $SO_3$ is driven off, and the coke becomes whiter in appearance. Analysis at this stage may correspond to $O:Cr.SO_4.Cr:O$.

On further heating, such as "flash" firing, the coke may yield the desired fluffy chromic oxide. This firing is carried out by rapidly heating the coke initially formed to a temperature of about 2400° F., and holding the material at this temperature for only a limited period of time, depending somewhat upon the size of the furnace, the amount of the charge, and the method of firing; but the product should be removed from the furnace before the fluffy chromic oxide formed has been overheated, as this may convert it into a dense product.

(B) *Syrup firing*

It would be expected that pouring a water-containing syrup onto the hearth of a furnace at 2400° F. would result in explosive violence, causing at least spattering of the syrup, or cracking of hearth, due to thermal shock. It was found, however, that this was not the case. There is no spattering—not even a serious thermal shock. Much of the water appears to be chemically held. The liquid floats for an instant on a protective gaseous film then sets to a coke-like solid—still protected by the gaseous film. It is a difficult thing to observe accurately, but it appears that a tough, resinous skin quickly fuses around the entire charge. Then the mass swells to about 3 or 4 times its liquid volume, expanding in all directions as the coke momentarily forms and sets, but without spattering or loss of material. Then small holes appear in the skin, and white fumes escape quickly, but without violence or dust loss.

The time required depends on the temperature of furnace, and size of charge. It may approach flash firing. In a small laboratory furnace at 2400° F., the thermal decompositions may require one minute, with an extra two or three minutes to assure uniformity. Using lower temperatures, or larger charges, which have slower heat transmission, the firing time may be increased to about 15 minutes, but leaving it in the furnace much longer than this may tend towards the formation of the ordinary dense chromic oxide.

In carrying out the firing, it is important, as hereinbefore pointed out, that the material be heated rapidly to the necessary high temperature, without permitting it to come to equilibrium at intermediate stages; and it is also important that overheating or prolonged heating be avoided such as would convert the new intermediate fluffy oxide into a final dense form.

The fluffy oxide produced by the present process does not stick to the hearth of the furnace but is readily removable therefrom. It may come out much like a crumbly pancake, disintegrating on cooling to a very fine, uniform, porous, soft, fluffy green powder. It requires no grinding. It is the new intermediate fluffy chromic oxide having the empirical formula $Cr_2O_3$. It possesses the superior oil absorption and other properties and applications hereinbefore referred to.

When the new product is made according to the foregoing illustrated procedure, the apparent specific gravity may be between 0.300 and 0.900; its oil absorption between 20 and 30; its tinting strength unusually high; its mass color a superior, pure, bright green; and it is permanent in all respects. The following shows a chemical analysis of such a type of fluffy green chromic oxide:

| | Percent |
|---|---|
| $Cr_2O_3$ | 99.15 |
| $Al_2O_3$ | 0.18 |
| $SO_3$ | 0.16 |
| $SiO_2$ | 0.12 |
| $Fe_2O_3$ | 0.07 |

The oil absorption and apparent specific gravity of the new fluffy chromic oxide green pigments are illustrated by the following table, showing some characteristic products produced by firing of the syrup, with indication of the firing temperature, the oil absorption and the apparent specific gravity:

| Firing temp., °F. | Oil absorption | Apparent sp. gr. |
|---|---|---|
| 2,300 | 24 | 0.540 |
| 2,400 | 22 | 0.556 |
| 2,500 | 19 | 0.596 |
| 2,300 | 29 | 0.710 |
| 2,400 | 29 | 0.740 |
| 2,500 | 21 | 0.856 |
| 2,300 | 25 | 0.526 |

THEORETICAL EXPLANATION

While I do not wish to limit myself by any theoretical explanation of the reactions, and of the reason for the formation of the new fluffy chromic oxide, I have attempted to explain such formation by the following theory:

My theory is that the desired fluffy chromic oxide results from the direct decomposition of a single-internal coordinated chromium compound, and is harmed by greater than one degree of internal coordination. Blue and violet modifications of chromium compounds, which are believed to be solely externally coordinated, can be seen to shift instantly to an internal coordination (green) when fired. The general idea is to effect complete thermal decomposition to the desired oxide before the first degree of internal coordination has had the time or opportunity to further shift to the second or third degree of internal coordination.

In addition there are harmful side reactions which are reduced to a minimum by quick firing. There is also the benefit of a mildly explosive disintegration resulting from flash firing. Another advantage is the skin formation which prevents dusting loss, and at the same time, tends to exclude furnace gases. A still further advantage is the internal coke-like structure, in conjunction with the external skin, which sets and holds the mass rigid after its initial swelling, with the result that there is no opportunity for undesirable rearrangement, condensation, polymerization or crystallization actions between different molecular complexes. The formation of the desired fluffy green oxide cannot be credited, however, entirely to the physical condition resulting from the coke and skin during the firing, because, when the syrup is made into a dough by kneading in an equal amount of an unconverted hydrous oxide, the mixture, on firing, cokes and skins without dusting, quite similar to the straight syrup, but the resulting chromic oxide only approximates the average of the two oxides, if fired separately. In other words, the chromium compounds being fired, should have the correct coordination, or molecular structure, as well as desirable outward physical characteristics, in order to obtain the best results.

FLUFFY COMPOSITE CHROMIC OXIDE PIGMENTS

Valuable composite pigments containing the fluffy chromic oxide in combination with other oxides (whether in a physically admixed or chemically combined state) can advantageously be prepared by adding solutions of decomposable salts of other metals to the chromic syrup to form homogeneous admixtures therewith before firing.

Solutions of aluminum salts may thus be added directly to the chromic syrup to form homogeneous mixtures which can be fired like the straight chromic syrup. Aluminum sulfate, for example, may be employed as the source of the alumina. Particularly good results have been obtained with from 3 to 20% aluminum oxide ($Al_2O_3$) on the basis of the final oxide complex. Practically all the $SO_3$ is driven off during the firing operation.

The presence of the alumina during the firing of the syrup or coke appears to retard the speed at which the new chromic oxide changes to the ordinary type at high firing temperatures, with the result that the presence of small amounts of harmful impurities, such as traces of soda, are partially counteracted; and minor variations in operation, or raw materials, have less effect on the shade of the finished product.

The alumina and chromic oxide appear to be in some form of combination since the properties of the new composite chrome-alumina pigment are different from those of a physical mixture of the individual oxides in the same proportions.

The resulting chrome-alumina oxide retains the new soft, porous, fluffy structure and is even a clearer, cleaner, brighter green color than the chromic oxide itself, notwithstanding the fact that less chromium is present.

The new chrome-alumina pigments possess the same general type of desirable properties and applications as the pure fluffy green chromic oxide, hereinbefore referred to.

The apparent specific volume, oil absorption, and related properties are increased by the combination with alumina so that they are somewhat higher than for the pure fluffy green chromic oxide prepared under similar conditions. The new composite pigments are exceptionally suitable for most purposes, including particularly use in printing inks and paints.

The following chemical analyses illustrate two fluffy chrome-alumina green pigments made by adding different proportions of aluminum sulfate to the chromic syrup before firing:

|  | Per cent | Per cent |
|---|---|---|
| $Cr_2O_3$ | 95.88 | 81.14 |
| $Al_2O_3$ | 3.27 | 18.01 |
| $SO_3$ | 0.16 | 0.16 |

In a similar manner it is possible to combine a number of other oxides with the new fluffy chromic oxide by stirring into the chromic syrup appropriate compounds of other metals which are decomposable on firing to give the corresponding oxide. Solutions of these other metal salts may be added individually or together with salts of aluminum; and composite pigments containing two or more other oxides can be similarly made by adding decomposable compounds of these various metals to the chromic syrup before firing. New and improved composite pigments of a permanent character can thus be obtained by adding different compounds to the chromic syrup and directly firing the syrup-like, or potentially intumescent compositions containing other pigment-forming oxides, to obtain composite pigments containing oxides of iron, nickel, titanium, etc. Thus, for example, the chromic syrup, or the alumina-chromic syrup, may be combined and fired to produce many new permanent pigments, by incorporation into the syrup, before firing, compounds such as those of cobalt, nickel, iron, manganese, tin, zinc, silica, titanium, etc. It is apparently possible to incorporate into pigments by this method almost any type of inorganic radical; although inorganic compounds such as sodium compounds should be excluded in any appreciable amount because of their detrimental effect.

The production of these other composite pigments will be further illustrated by the production of chrome-cobalt, and chrome-alumina-cobalt pigments.

Especially desirable pigments ranging in color from blue to green may be made by incorporation of a soluble cobalt salt, for example, cobaltous nitrate, with the pure chromic syrup, or with an admixed alumina-chromic syrup, and firing in the manner previously described.

Particularly good results have been obtained with combinations containing from 2 to 30% cobalt oxide (CoO) on the basis of the final oxide complex. Practically all thermally decomposable acidic radicals are driven off during the firing operation. The cobalt and chromium, or the cobalt, chromium and alumina, appear to be in combination since the properties, including color, are distinctly different from those of physical mixtures of the pure oxides. For example, the strength and clarity of color of the new composite pigments are very much superior to physical mixtures of pure cobalt blue and chrome oxide green in the same proportions. In fact it is not possible to duplicate the new permanent blue-green pigments by mixture of known permanent pigments.

The new combined cobalt-chrome pigments, and cobalt-chrome-alumina pigments, possess the same general type of desirable properties and applications as the pure, fluffy green chromic oxide. However, they enable modified shades and colors to be produced, different from that of the pure chromic oxide. If a large proportion of metallic oxide, such as that of cobalt, is present during firing, the furnace product may not disintegrate to a powder on withdrawal from the firing furnace. It is, however, quite soft and friable and readily breaks up or disintegrates to a fine, soft, porous, uniform, fluffy powder on shaking or light crushing.

The following chemical analyses illustrate two different fluffy cobalt-containing pigments, made in the manner above described:

|  | Per cent | Per cent |
|---|---|---|
| $Cr_2O_3$ | 87.2 | 60.5 |
| CoO | 12.0 | 21.3 |
| $Al_2O_3$ | None | 15.9 |

Both of these pigments are exceedingly bright, clear, blue-green pigments with exceptional tinting power, and a purity and clearness of shade which cannot be duplicated by known permanent pigments so far as I am aware.

The oil absorption and apparent specific gravity of the new composite pigments containing cobalt oxide, alumina, or both, is illustrated by the following table showing the percent of the respective oxides based on the final oxide complex:

|  | Firing temp. | Oil absorption | Apparent sp. gr. |
|---|---|---|---|
| 2% $Al_2O_3$ | 2,400 | 34 | 0.618 |
| 20% $Al_2O_3$ | 2,300 | 39 | 0.450 |
| 20% $Al_2O_3$ | 2,400 | 28 | 0.467 |
| 20% $Al_2O_3$ | 2,500 | 33 | 0.444 |
| 20% $Al_2O_3$ | 2,400 | 35 | 0.712 |
| 2% CoO, 15% $Al_2O_3$ | 2,400 | 30 | 0.500 |
| 10% CoO, 15% $Al_2O_3$ | 2,400 | 29 | 0.382 |
| 20% CoO, 15% $Al_2O_3$ | 2,400 | 32 | 0.680 |
| 20% CoO | 2,400 | 29 | 1.148 |
| 10% CoO | 2,400 | 27 | 0.521 |

New paint compositions result when the new fluffy chromic oxide is used with paint vehicles, and, when the new composite pigments are so used. New paint compositions can thus be made with or without other pigments or fillers, such as are commonly required with the ordinary dense chromic oxide pigments, since the new pigments possess valuable oil absorbing properties which enable them to be used alone to advantage with paint vehicles, such as linseed oil, etc. The new pigment compositions thus made can be used for various purposes, such as those hereinbefore referred to.

The new pigments can, of course, be used as tinting pigments, etc., together with other pigments, in paint compositions, etc.

This application is a division of my application Serial No. 212,392, filed June 7, 1938, now Patent No. 2,209,899. I do not, in this application, claim the new pigments, the new syrup form of a sulfate combination of hydrous chromic oxide, the new coke-like sulfate combination of hydrous chromic oxide, or the method of producing these products described herein, as this subject matter is claimed in said application Serial No. 212,392. In this application I claim the method of producing the hydrous chromic oxide described herein, the method of treating hydrous chromic oxide with acid, as well as the uniform hydrous chromic oxide and the alkali-free hydrous chromic oxide described herein.

I claim:

1. A uniform hydrous chromic oxide, obtained by reduction of a sodium chromate with an alkaline sulfur emulsion in water, under substantially uniform conditions of temperature and concentration of dissolved reactants throughout the reduction, said hydrated oxide consisting substantially of a single type of hydrated hydrous chromic oxide.

2. The improved method of reducing alkali chromate and of producing hydrous chromic oxide which comprises gradually adding a solution of an alkali chromate to a boiling alkaline emulsion of sulfur in a sodium sulfide solution and regulating the alkalinity so as to maintain it substantially uniform throughout the process.

3. The method of reducing a sodium chromate and of producing a hydrous chromic oxide which comprises gradually adding a solution of a sodium chromate to a boiling emulsion of sulfur in a sodium sulfide solution, and controlling the addition and the proportions of the reagents so as to maintain substantially uniform concentration of dissolved reactants throughout the reaction.

4. The method of treating a hydrous chromic oxide resulting from the reduction of an alkali chromate with an aqueous alkaline emulsion of sulphur which includes the step of digesting the hydrous chromic oxide with a heated acid liquor, the pH of which, during digestive contact with the hydrous chromic oxide, is maintained between approximately 3 and 5.

MARC DARRIN.